United States Patent
Breeden et al.

(10) Patent No.: US 8,973,222 B2
(45) Date of Patent: Mar. 10, 2015

(54) RETRACTABLE RATCHETING TIE DOWN

(75) Inventors: Winston Breeden, Chagrin Falls, OH (US); Thaddeus T. Brej, Rocky River, OH (US)

(73) Assignee: Winston Products LLC, Cleveland, OH (US)

( * ) Notice: Subject to any disclaimer, the term of this patent is extended or adjusted under 35 U.S.C. 154(b) by 426 days.

(21) Appl. No.: 13/421,989

(22) Filed: Mar. 16, 2012

(65) Prior Publication Data
US 2012/0233824 A1 Sep. 20, 2012

Related U.S. Application Data

(60) Provisional application No. 61/454,272, filed on Mar. 18, 2011.

(51) Int. Cl.
*B60P 7/06* (2006.01)
*B60P 7/08* (2006.01)

(52) U.S. Cl.
CPC .............. *B60P 7/083* (2013.01); *B60P 7/0853* (2013.01); *B60P 7/0823* (2013.01); *Y10S 24/909* (2013.01)
USPC ......... 24/68 CD; 24/71.1; 24/909; 242/388.3; 254/223

(58) Field of Classification Search
CPC ...... B60P 7/083; B60P 7/0823; B60P 7/0853; Y10S 24/909
USPC .............. 24/68 CD, 71.1, 909; 254/217, 222, 254/223; 242/388.3, 393, 396.4, 395; 410/100
See application file for complete search history.

(56) References Cited

U.S. PATENT DOCUMENTS

| | | | | |
|---|---|---|---|---|
| 3,352,590 A | * | 11/1967 | Barthule | 294/74 |
| 4,155,537 A | * | 5/1979 | Bronson et al. | 254/223 |
| 4,510,652 A | * | 4/1985 | van Iperen | 24/68 CD |
| 6,799,751 B1 | * | 10/2004 | Anderson | 254/223 |
| 7,789,603 B2 | * | 9/2010 | Huck | 410/100 |
| 7,942,360 B2 | * | 5/2011 | Breeden | 254/221 |
| 2007/0170295 A1 | * | 7/2007 | Breeden | 242/388.1 |
| 2009/0047091 A1 | * | 2/2009 | Huck | 410/100 |
| 2011/0150595 A1 | * | 6/2011 | Foryan | 254/223 |

* cited by examiner

*Primary Examiner* — Robert J Sandy
(74) *Attorney, Agent, or Firm* — Cooper Legal Group, LLC

(57) ABSTRACT

A retractable ratcheting tie down apparatus is provided, including a frame and a hub rotatably mounted within the frame. A ratchet wheel is mounted to the hub and interfaces with a pawl to selectably prevent motion of the hub relative to the frame. A single tie down strap extends between two attachment members and winds around the hub. An operable means for rotating the hub and ratchet wheel is included to wind the single tie down strap around the hub. Tension between the two attachment members is transmitted directly through the single tie down strap and transitions between segments of the single tie down strap at the windings of the single tie down strap about the hub. In further examples, the operable means for rotating the hub and ratchet wheel is removable. The tie down apparatus can also move freely along the single tie down strap.

19 Claims, 8 Drawing Sheets

RETRACTABLE RATCHETING TIE DOWN

RELATED APPLICATIONS

This application claims the benefit of U.S. Provisional Application No. 61/454,272, filed on Mar. 18, 2011, the entire disclosure of which is hereby incorporated herein by reference.

FIELD OF THE INVENTION

The present invention relates generally to a ratcheting tie down for securing cargo, and in particular, to a retractable ratcheting tie down with bidirectional tensioning for securing cargo.

BACKGROUND OF THE INVENTION

A ratcheting tie-down device can be used to secure a wide variety of objects to various support surfaces and/or to various other objects. Conventionally, a ratcheting tie-down device has a ratcheting mechanism and a webbing with at least one extendable end. In one example, a ratcheting tie down device can include two webbing assemblies, including one webbing assembly of a fixed, non-extendable length and another webbing assembly that is extendable to make the ratcheting tie-down adjustable to a wide variety of lengths. The distal ends of both webbing assemblies can be attached to suitable anchor points on an object or surface. The ratcheting mechanism can then be used to remove any slack in the webbing assemblies and apply tension to ensure that the tied-down objects are retained securely. However, ratcheting tie down devices including webbing in two different assemblies lack the potential for bidirectional tensioning. Furthermore, many ratcheting tie down devices lack the potential to locate the ratcheting tie down device at any desired location between the two anchor points. Accordingly, it would be beneficial to provide a ratcheting tie-down device that can overcome the aforementioned problems.

BRIEF SUMMARY OF THE INVENTION

The following presents a simplified summary of the invention in order to provide a basic understanding of some aspects of the invention. This summary is not an extensive overview of the invention. It is intended to identify neither key nor critical elements of the invention nor delineate the scope of the invention. Its sole purpose is to present some concepts of the invention in a simplified form as a prelude to the more detailed description that is presented later.

In accordance with one aspect of the present invention, a retractable ratcheting tie down apparatus includes a frame and a hub rotatably mounted within the frame. The retractable ratcheting tie down apparatus further includes a ratchet wheel mounted to the hub and a pawl. The pawl interfaces with the ratchet wheel to selectably prevent motion of the hub relative to the frame. The retractable ratcheting tie down apparatus also includes a single tie down strap extending between two attachment members. The single tie down strap extends through the hub between the two attachment members, and the single tie down strap is configured to permit winding of the single tie down strap around the hub. The retractable ratcheting tie down apparatus further includes an operable means for rotating the hub and ratchet wheel to wind the single tie down strap around the hub. Tension between the two attachment members is transmitted directly through the single tie down strap and transitions between segments of the single tie down strap at the windings of the single tie down strap about the hub.

In accordance with another aspect of the present invention, a retractable ratcheting tie down apparatus includes a frame and a hub rotatably mounted within the frame. The retractable ratcheting tie down apparatus further includes a ratchet wheel mounted to the hub and a pawl. The pawl interfaces with the ratchet wheel to selectably prevent motion of the hub relative to the frame. The retractable ratcheting tie down apparatus also includes a single tie down strap extending between two attachment members. The single tie down strap extends through the hub between the two attachment members, and the single tie down strap is configured to permit winding of the single tie down strap around the hub. The retractable ratcheting tie down apparatus further includes an operable means for rotating the hub and ratchet wheel to wind the single tie down strap around the hub. Tension between the two attachment members is transmitted directly through the single tie down strap and transitions between segments of the single tie down strap at the windings of the single tie down strap about the hub. The operable means for rotating the hub and ratchet wheel is removable from the retractable ratcheting tie down apparatus.

In accordance with another aspect of the present invention, a retractable ratcheting tie down apparatus includes a frame and a hub rotatably mounted within the frame. The retractable ratcheting tie down apparatus further includes a ratchet wheel mounted to the hub and a pawl. The pawl interfaces with the ratchet wheel to selectably prevent motion of the hub relative to the frame. The retractable ratcheting tie down apparatus also includes a single tie down strap extending between two attachment members. The single tie down strap extends through the hub between the two attachment members, and the single tie down strap is configured to permit winding of the single tie down strap around the hub. The single tie down strap extends through the hub such that the frame can freely move along the single tie down strap when the single tie down strap is in the a fully extended position. The retractable ratcheting tie down apparatus further includes an operable means for rotating the hub and ratchet wheel to wind the single tie down strap around the hub. Tension between the two attachment members is transmitted directly through the single tie down strap and transitions between segments of the single tie down strap at the windings of the single tie down strap about the hub.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Example embodiments of a device that incorporates aspects of the present application are described and shown in the attached sketches. It is to be appreciated that the shown examples are not intended to be a limitation on the present application. For example, one or more aspects of the present application can be utilized in other embodiments and even other types of devices.

Figure 1:
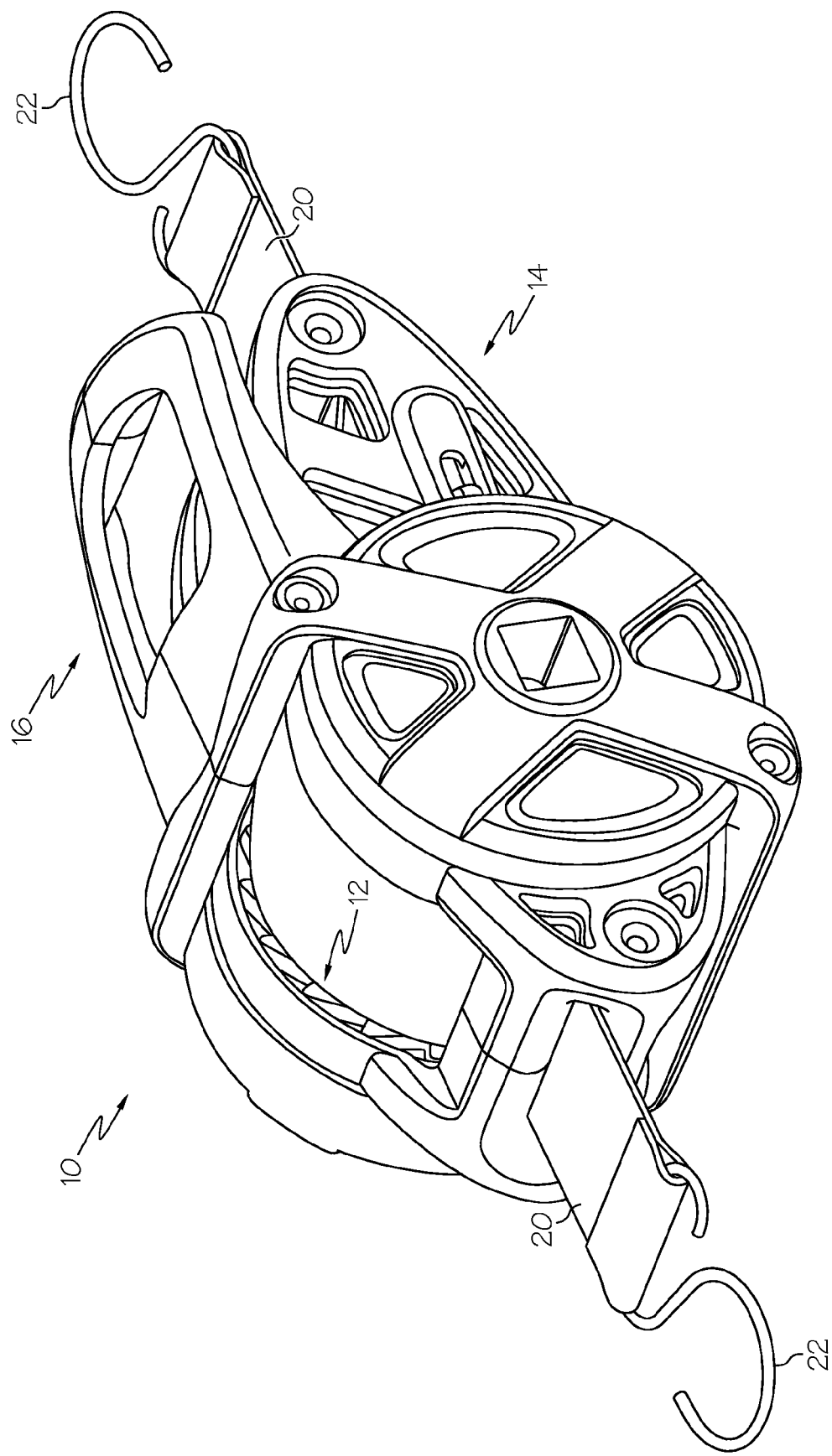
FIG. 1 is a perspective view of an example retractable ratcheting tie down in accordance with an aspect of the present invention.

Turning to the shown example of FIG. 1, an example retractable ratcheting tie down 10 is provided. It is to be appreciated that FIG. 1 shows one example of possible structures/configurations/etc. and that other examples are contemplated within the scope of the present invention. In one specific example, the retractable ratcheting tie down 10 is used to secure a wide variety of objects to various support surfaces and/or to various other objects. The retractable ratcheting tie down 10 can include three sub-assemblies including a reel 12, a frame constructed of a frame assembly 14, and a release handle assembly 16. A single tie down strap 20 extends between two hooks 22. Typical tie down straps can also be known as webbing and various other names. The retractable ratcheting tie down 10 is shown generally in a position such that a length of the single tie down strap 20 is partially wound within the interior of the retractable ratcheting tie down 10 while some length of the single tie down strap 20 is extended a distance in two opposing directions from the retractable ratcheting tie down 10. The single tie down strap 20 can be considered to have two segments, the first segment extending from the reel 12 to one of the hooks 22 and the other segment similarly extending from the reel 12 to the other of the hooks 22.

Figure 2:
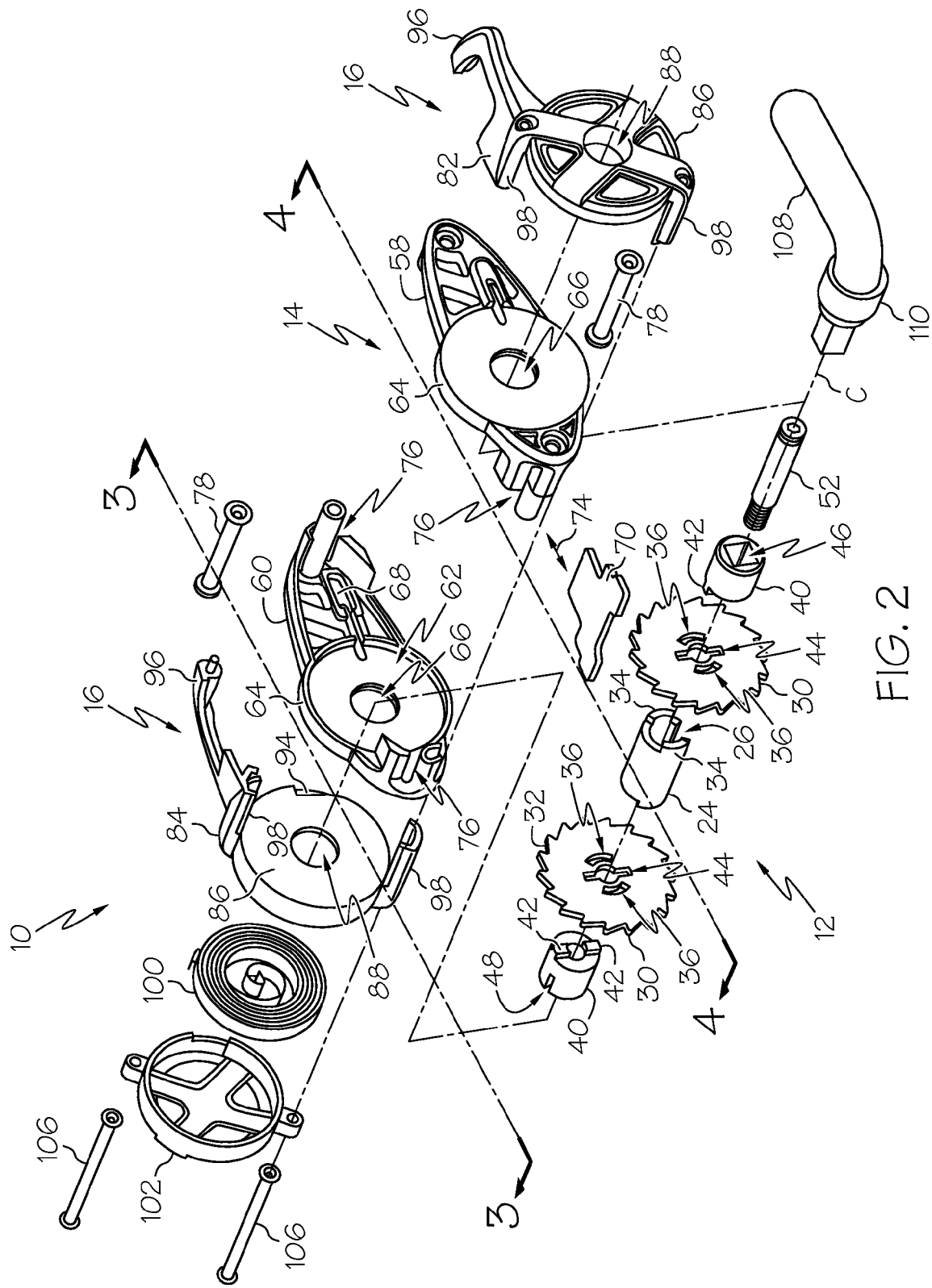
FIG. 2 is an exploded view of the retractable ratcheting tie down of FIG. 1 with the single tie down strap not shown but with a tension handle shown.

Turning to FIG. 2, an exploded view of the retractable ratcheting tie down 10 is shown. The retractable ratcheting tie down 10 can include a reel 12. The reel 12 can include a hub 24. In one example, the hub is of a hollow cylindrical shape, although it is to be appreciated that the hub can be of any shape around which the single tie down strap 20 (not shown) can be wound. The hub 24 includes a hub aperture 26. In one example, the hub aperture 26 can be defined by a hub 24 that is cylindrical in shape and has an incomplete circumference. The hub 24 is substantially complete about its circumference, but a gap in the circumference can define the hub aperture 26 for a portion of or for the entire length of the hub 24. The reel 12 can also include at least one ratchet wheel 30. A plurality of teeth 32 are located on the circumference of the ratchet wheel 30. The ratchet wheel 30 is mounted to the hub 24 so that the ratchet wheel 30 and the hub 24 rotate in unison. In one example, the hub 24 can include tabs 34 that are insertable into slots 36 defined by the ratchet wheel 30. It is to be appreciated that any form of connection between the hub 24 and the ratchet wheel 30 are contemplated, including but not limited to inter-fitting portions, soldering, welding, adhesives, riveting, etc.

The reel 12 can also include at least one bearing 40. The bearing 40 can be firmly attached to the ratchet wheel 30 or the hub 24 so that the bearing 40, the ratchet wheel 30, and the hub 24 rotate in unison. Similar to the tab and slot arrangement of attachment between the hub 24 and the ratchet wheel 30, the bearing 40 can include tabs 42 which are configured to be insertable into a slot 44 defined by the ratchet wheel 30. It is to be appreciated that any form of connection between the ratchet wheel 30 and the bearing 40 are contemplated, including but not limited to soldering, welding, adhesives, riveting, etc. In the shown example of FIG. 2, one bearing 40 is located at each end of the reel 12. One of the bearings 40 can include an opening 46 that is configured to interact with a machine tool included in a standard toolkit. For example, the opening 46 can be ⅜-inch square. The other of the bearings 40 can include a slot 48 configured to interact with a spring as will be described below.

The reel 12 can also include a central shaft 52. In one example, the central shaft 52 can pass through the bearing 40, the ratchet wheel 30 and the hub 24 and provide a centerline axis "C" around which each of the described parts of the reel 12 can rotate. In the example shown in FIG. 2, the central shaft 52 is connected to a bearing 40 at each of its ends in order to hold the bearings 40, the ratchet wheel 30, and the hub 24 together as a unitary piece. In one example, the central shaft 52 includes male threads at each end, each set of threads interacting with female threads included in each of bearing 40. It is to be appreciated that any methods of connecting the central shaft 52 to the bearing 40 are contemplated. In the shown example of FIG. 2, the reel 12 is described as an assembly of several component parts. However, the reel 12 can be constructed of one unitary piece or the reel 12 can be constructed of any number of smaller assemblies of any combinations of the described components of the reel 12.

The retractable ratcheting tie down 10 further includes a frame constructed of a frame assembly 14. The frame assembly 14 can include a first frame cover 58 and a second frame cover 60. The first frame cover 58 and the second frame cover 60 can each define at least a portion of a cylindrical cavity 62 that is centered about centerline axis C of the reel 12. The corresponding portions of the cylindrical cavity 62 defined by the first frame cover 58 and second frame cover 60 are configured to mate to create a cavity in which the reel 12 is located. The exterior surfaces 64 of the first frame cover 58 and the second frame cover 60 surrounding the cylindrical cavity 62 can have a smooth radius from the centerline axis C to create a semi-circular shape. The first frame cover 58 and the second frame cover 60 can each define an opening 66. Each opening 66 can be circular and centered about centerline axis C. The inside dimensions of each opening 66 can be configured to be similar to the outside dimensions of each bearing 40 so that the round surfaces of each opening 66 can act as a bearing surface on which each bearing 40 or at least a portion of bearing 40 can rotate. The first frame cover 58 and the second frame cover 60 can each include a slot 68 providing sliding engagement for a pawl 70 which can interface with the ratchet wheel 30. It is to be appreciated that the slot 68 structure is best seen on the second frame cover 60 as shown in FIG. 2, however similar corresponding structure is included on the first frame cover 58. The slot 68 is configured to permit the pawl 70 to selectively move in the direction shown by arrow 74 to engage with the ratchet wheel 30 at one end of travel, and disengage from the ratchet wheel 30 at the other end of travel. While not shown, the frame assembly 14 can include a device to urge the pawl 70 toward the ratchet wheel 30. For example, the frame assembly 14 can include a compression spring to provide a force urging the pawl 70 toward the ratchet wheel 30.

The frame assembly 14 can also define apertures 76 through which the single tie down strap 20 (not shown in FIG. 2) can be threaded. Each of the first frame cover 58 and the second frame cover 60 can define equal halves of the apertures 76. When the first frame cover 58 and second frame cover 60 are mated together, the two frame covers 58, 60 can define the entire width of the apertures 76. Alternatively, each of the frame covers 58, 60 can define any fraction of the apertures 76 including the entire width of the aperture 76. The apertures 76 are configured to be generally coplanar with the hub aperture 26.

The first frame cover 58 and second frame cover 60 can be attached to each other by any means as are known art. In one example, the first frame cover 58 and the second frame cover 60 are attached with rivets 78. It is to be appreciated that other forms of attachment are contemplated. When the first frame cover 58 and the second frame cover 60 are attached, a cylindrical cavity 62 is created that can house the reel 12 and the pawl 70. The reel 12 and the hub 24 are rotatably mounted within the frame assembly 14.

The retractable ratcheting tie down 10 further includes a release handle assembly 16. The release handle assembly 16 is configured to remove the interface between the pawl 70 and ratchet wheel 30 on the reel 12. The release handle assembly 16 can include a first handle portion 82 and a second handle portion 84. Each of the first handle portion 82 and a second handle portion 84 can be located on the exterior of the first frame cover 58 and the second frame cover 60. The first handle portion 82 and the second handle portion 84 can each include a central portion 86. The central portion 86 can be substantially circular in shape. Each central portion 86 can define an opening 88. Similar to the openings 66, each opening 88 can be circular and centered about centerline axis C. The inside dimensions of each opening 88 can be configured to be similar to the outside dimensions of each bearing 40 so that the round surfaces of each opening 88 can act as a bearing surface on which each bearing 40 or at least a portion of bearing 40 can rotate.

Figure 3:
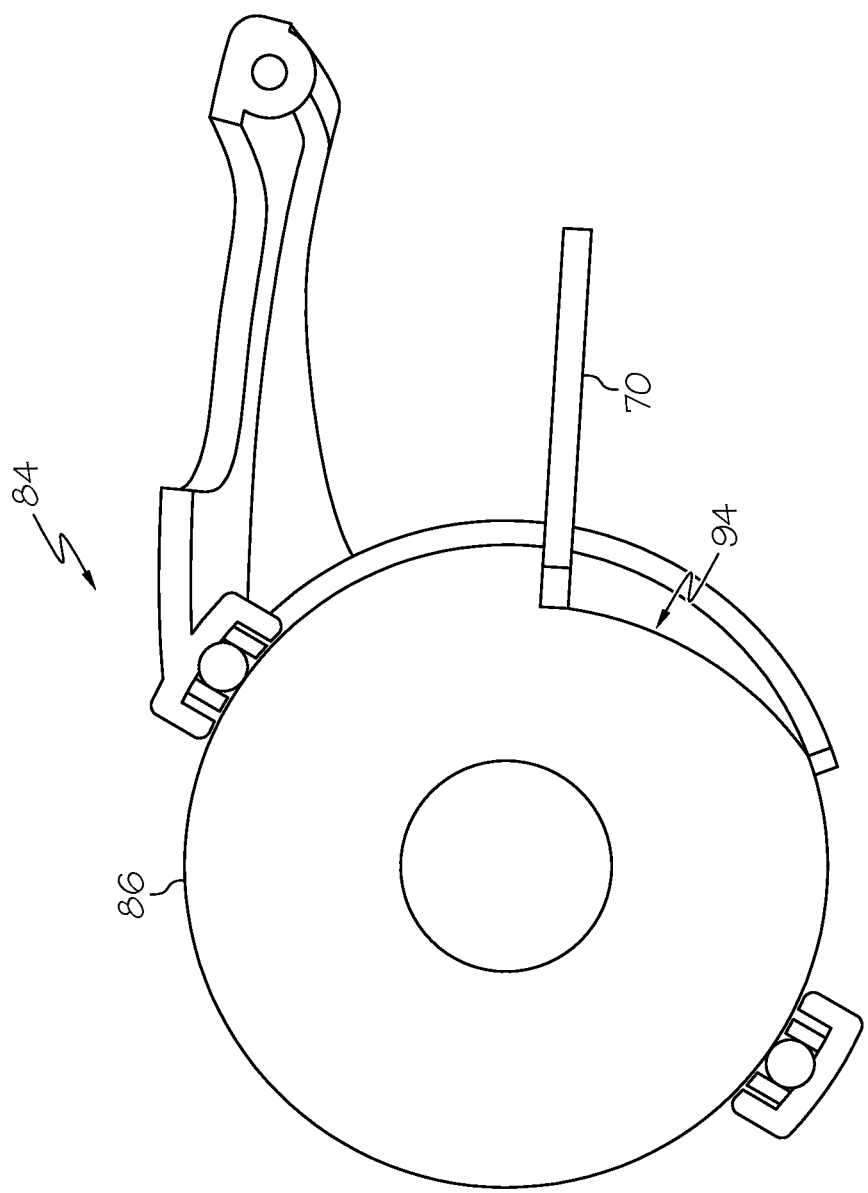
FIG. 3 is a cross-sectional view along line 3-3 of FIG. 2 and non-exploded, with a pawl included within the view to clarify the relationship between the cammed surface and the pawl.

Turning to FIG. 3, at least part of the outside diameter of the central portion 86 can include a cammed surface 94. The cammed surface 94 can be on one or both of the first handle portion 82 and the second handle portion 84. In one example, the cammed surface 94 includes a changing radius over an arcuate section of the outside diameter of the second handle portion 84. The cammed surface 94 can include the entire thickness of the central portion 86, or it can occupy a fraction of the entire thickness of the central portion 86, as is shown in FIG. 3. For example, the cammed surface 94 can be one half of the thickness of the central portion 86. In one example, the arc of the cammed surface 94 can be approximately 60°. When the retractable ratcheting tie down 10 is assembled, the cammed surface 94 is configured to interact with at least one surface of the pawl 70.

Returning to FIG. 2, the central portion 86 of one or both of the first handle portion 82 and the second handle portion 84 can include prongs 98 configured to interact with the opposing handle portion. The prongs 98 are configured to provide a connection location between the first handle portion 82 and the second handle portion 84. The handle portions 82, 84 can be configured to rotate about the centerline axis C while the prongs 98 are in contact with the frame assembly 14 exterior surfaces 64. Alternatively, the prongs 98 can be configured to rotate at a diameter greater than the diameter of the exterior surfaces 64 so that the prongs 98 do not touch the exterior surfaces 64 during rotation of the release handle assembly 16.

A release handle 96 can be attached to one or both of the first handle portion 82 and the second handle portion 84. Each of the first handle portion 82 and the second handle portion 84 can include a fraction of the release handle 96. The release handle assembly 16 can include a spring 100. The spring 100 is one example of a means for urging the hub 24 in order to move the single tie down strap 20 to the fully retracted position. Elastic devices, motors, and torque devices are all non-limiting examples of a means of urging the hub 24. The spring 100 can be located between the second handle portion 84 and a cover 102. A portion of the spring 100 can be configured to be placed within the slot 48 defined by bearing 40 so that rotation of the bearing 40 causes the spring 100 to wind or unwind. The cover 102 can include structure to prevent rotation of one end of the spring 100. In one example, the cover 102 can include a post suitable for engaging a hook on one end of the spring 100.

The first handle portion 82, the second handle portion 84, and the cover 102 can be attached to each other by any means as are known art. In one example, the first handle portion 82, the second handle portion 84, and the cover 102 are attached with rivets 106. Location of the rivets 106 is selected to permit rotation of the release handle assembly 16 about central axis C. In one example, the rivets 106 are placed in the prongs 98. It is to be appreciated that other forms of attachment are contemplated. In one example, when the cover 102 is mated to the second handle portion 84, a cavity is created suitable for containing the spring 100. Additionally, the release handle assembly 16 can at least partially surround the frame assembly 14.

Figure 4:
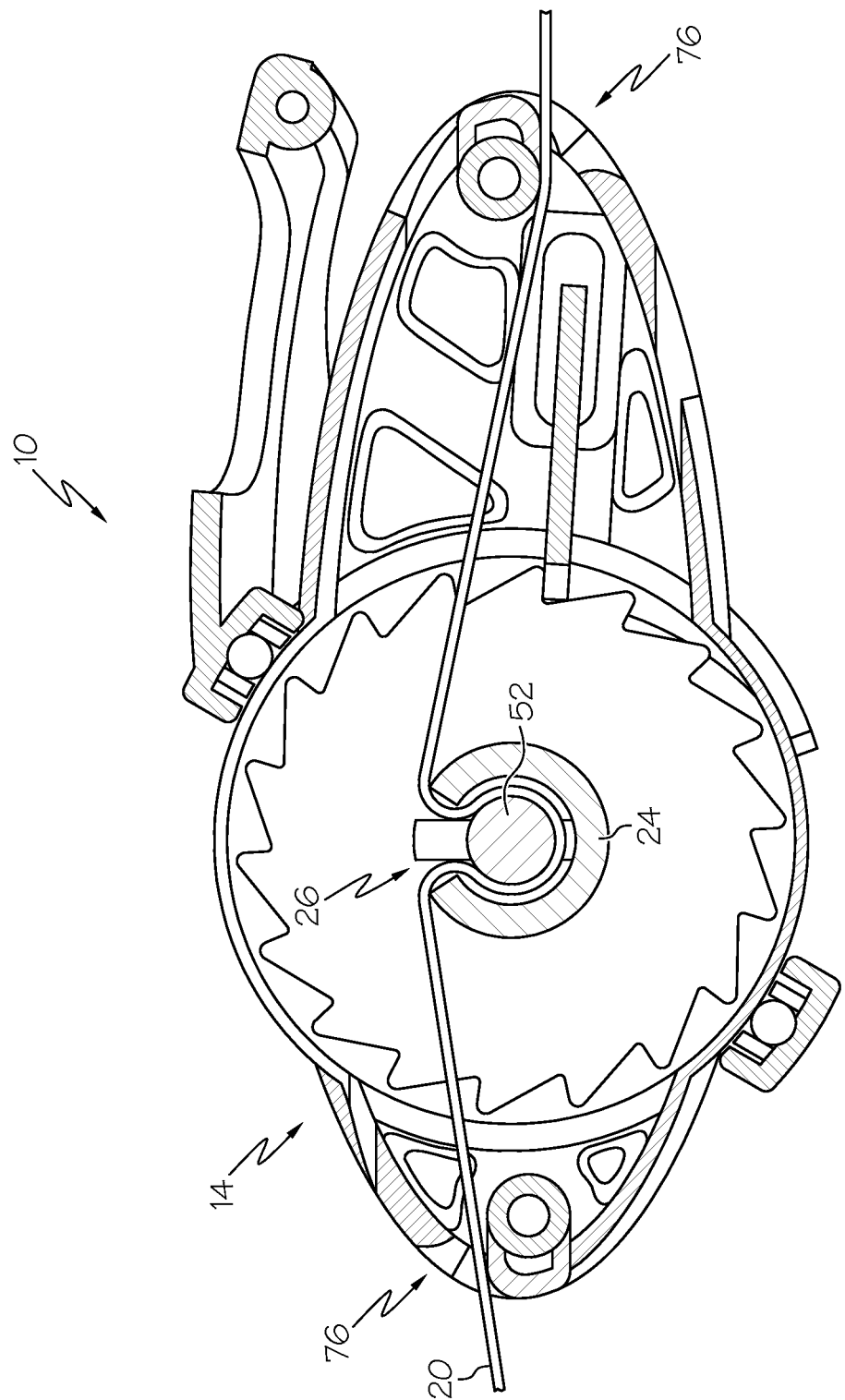
FIG. 4 is a cross-sectional view along line 4-4 of FIG. 2 and non-exploded, with the release handle assembly in a first position and the single tie down strap in a fully extended position.

Turning to FIG. 4, the single tie down strap 20 extends through the retractable ratcheting tie down 10 and the hub 24 between the two hooks 22 (best seen in FIG. 1). The single tie down strap 20 passes through one of the apertures 76 located in the frame assembly 14. The apertures 76 are configured to prevent rotation of the frame assembly 14 relative to the single tie down strap 20 during an operation to apply tension to the single tie down strap 20. The single tie down strap 20 extends through the hub. The single tie down strap 20 passes through the hub aperture 26 and is threaded through the annular space between the hub 24 and the central shaft 52. The single tie down strap 20 then passes through the hub aperture 26 once again and is then passed through another aperture 76 to a space outside the frame assembly 14. The single tie down strap 20 is configured to be wound around the hub 24 from a fully retracted position through a continuum of intermediate positions to a fully extended position in which the single tie down strap 20 is not wound around the hub 24. FIG. 4 shows the fully extended position. When the single tie down strap 20 is at its fully extended position (i.e., when no length of single tie down strap 20 is wound around the hub 24), the frame assembly 14 can freely move along the single tie down strap 20 to be located anywhere between the two hooks 22.

Figure 5:
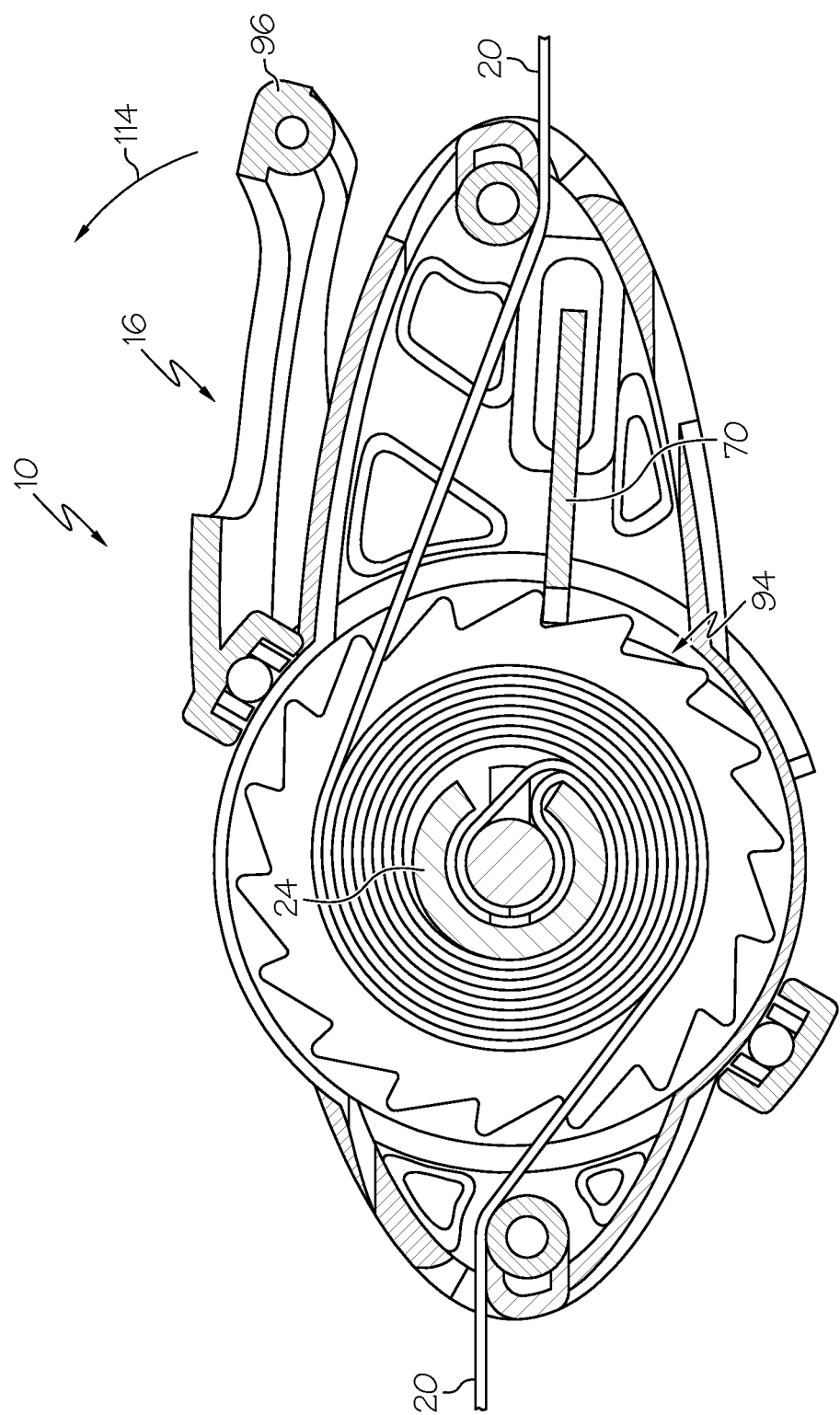
FIG. 5 is similar to FIG. 4, but shows the release handle assembly in a first position and the single tie down strap in a fully retracted position.
Figure 6:
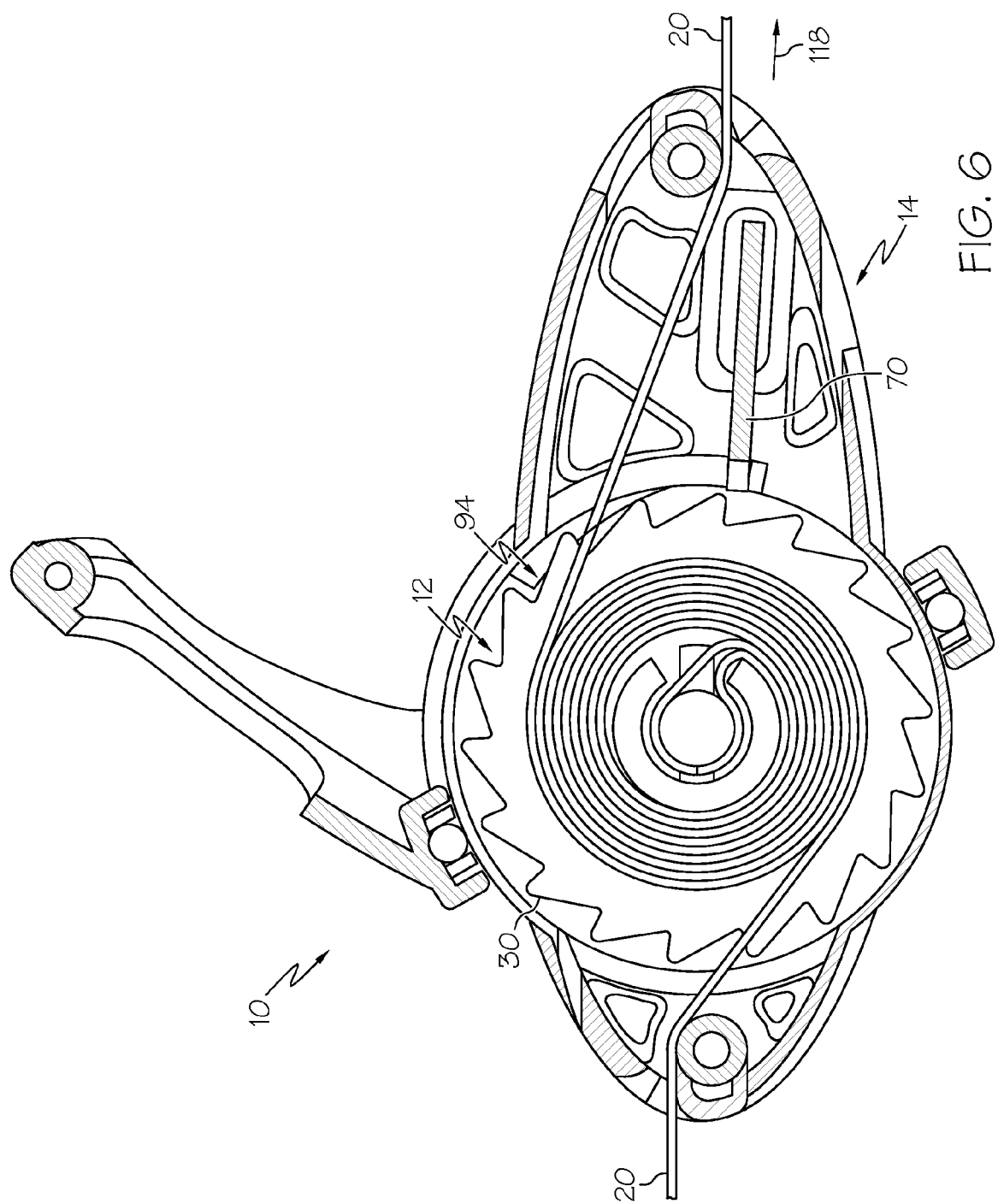
FIG. 6 is a view similar to FIG. 5, but shows the release handle assembly in a second position.

Moving on to a description of the operation of the retractable ratcheting tie down 10, in a first position, substantially all of the single tie down strap 20 is wound around the hub 24, considered the fully retracted position. This orientation can be seen in FIG. 5. A force is applied to the release handle 96 in the direction of arrow 114 to urge the release handle assembly 16 to rotate about centerline axis C. In one example, the range of rotation of the release handle assembly can be approximately 60°. Rotation of the release handle assembly rotates the cammed surface 94 relative to the pawl 70. After rotation, the pawl 70 contacts the cammed surface 94 at a point having a longer radius from the centerline axis C compared to before the rotation. As seen in FIG. 6, interaction with the longer radius of the cammed surface 94 urges the pawl 70 away from the ratchet wheel 30 in the direction of arrow 118 and overcomes the force of a device (e.g., a compression spring) to urge the pawl toward the ratchet wheel 30. Movement of the pawl 70 away from the ratchet wheel 30 disengages the pawl 70 from the ratchet wheel 30. When the pawl 70 is disengaged from the ratchet wheel 30, the reel 12 can rotate free of mechanical interference with the pawl 70. An operator can then pull both ends of the single tie down strap 20 away from the frame assembly 14 to rotate the reel 12 and move the single tie down strap 20 toward an extended position. This action adds energy to the spring 100 (best seen in FIG. 2). The single tie down strap 20 ends can be pulled away from the frame assembly 14 so that the single tie down strap 20 is in a position between a fully retracted position through a continuum of intermediate positions to a fully extended position in which the single tie down strap 20 is not wound around the hub 24. When the single tie down strap 20 is in the fully extended position as seen in FIG. 4, the operator can slide the retractable ratcheting tie down 10 to any desired location between the two hooks 22.

The two ends of the single tie down strap 20 can include hooks 22 (best seen in FIG. 1). A hook is one example of an attachment member, and bolt connections, knots, and closed loop arrangements are other non-limiting examples of an attachment member. The hooks 22 are used to attach the ends of the single tie down strap 20 to suitable anchor points 126 (best seen in FIG. 8). In one example, the hooks 22 on the ends of the single tie down strap 20 can interact with a luggage rack on the top of an automobile. In another example, at least one of the hooks 22 can interact with a hook of another retractable ratcheting tie down 10 to create a series of retractable ratcheting tie down 10 devices that can extend over a relatively longer distance. The retractable ratcheting tie down 10 can then be suitably located at a desired position along the single tie down strap 20 and cargo is located in a position so that when operated, the retractable ratcheting tie down 10 can securely hold the cargo to a surface, such as the top of the automobile or the bed of a trailer.

The release handle 96 is then rotated back toward the frame assembly 14 so that one surface of the pawl 70 contacts the cammed surface 94 at a point of shorter radius from the centerline axis C than other points along the cammed surface 94 as shown in FIG. 4. At this point of contact, the pawl 70 is not urged away from the ratchet wheel 30 by the cammed surface 94. The device to urge the pawl (e.g., a compression spring) applies a force to the pawl 70 so that the pawl 70 interfaces with the ratchet wheel 30 to selectably prevent motion of the hub 24 relative to the frame assembly 14. A tension handle 108 (best seen in FIG. 2) can be used to apply a tension force to the single tie down strap 20 by rotating the reel 12. The tension handle 108 is one example of a means of rotating the hub 24 to apply tension to the single tie down strap 20. A knob, a crank, and a power tool are all non-limiting examples of a means of rotating the hub to apply tension force to the single tie down strap 20. The tension handle 108 can interact with an opening 46 of one of the bearings 40 to rotate the reel 12 in a counterclockwise direction. In one example, the tension handle 108 can include a ratchet 110 to help ease the operation of rotating the hub 24 to apply a tension force to the single tie down strap 20. The tension handle 108 can be removable from the bearing 40. As the reel 12 and the ratchet wheel 30 rotate counterclockwise, the configuration of the tooth 32 on the ratchet wheel 30 increasingly force the pawl 70 in a direction away from the ratchet wheel 30 until the tooth 32 passes the pawl 70 at which point the compression spring urges the pawl 70 toward the ratchet wheel 30 to a point between two teeth 32. As the reel rotates in the counterclockwise direction, the interaction between one of the bearings 40 and the spring 100 (best seen in FIG. 2) also rotates the spring 100, removing energy from the spring 100.

Figure 7:
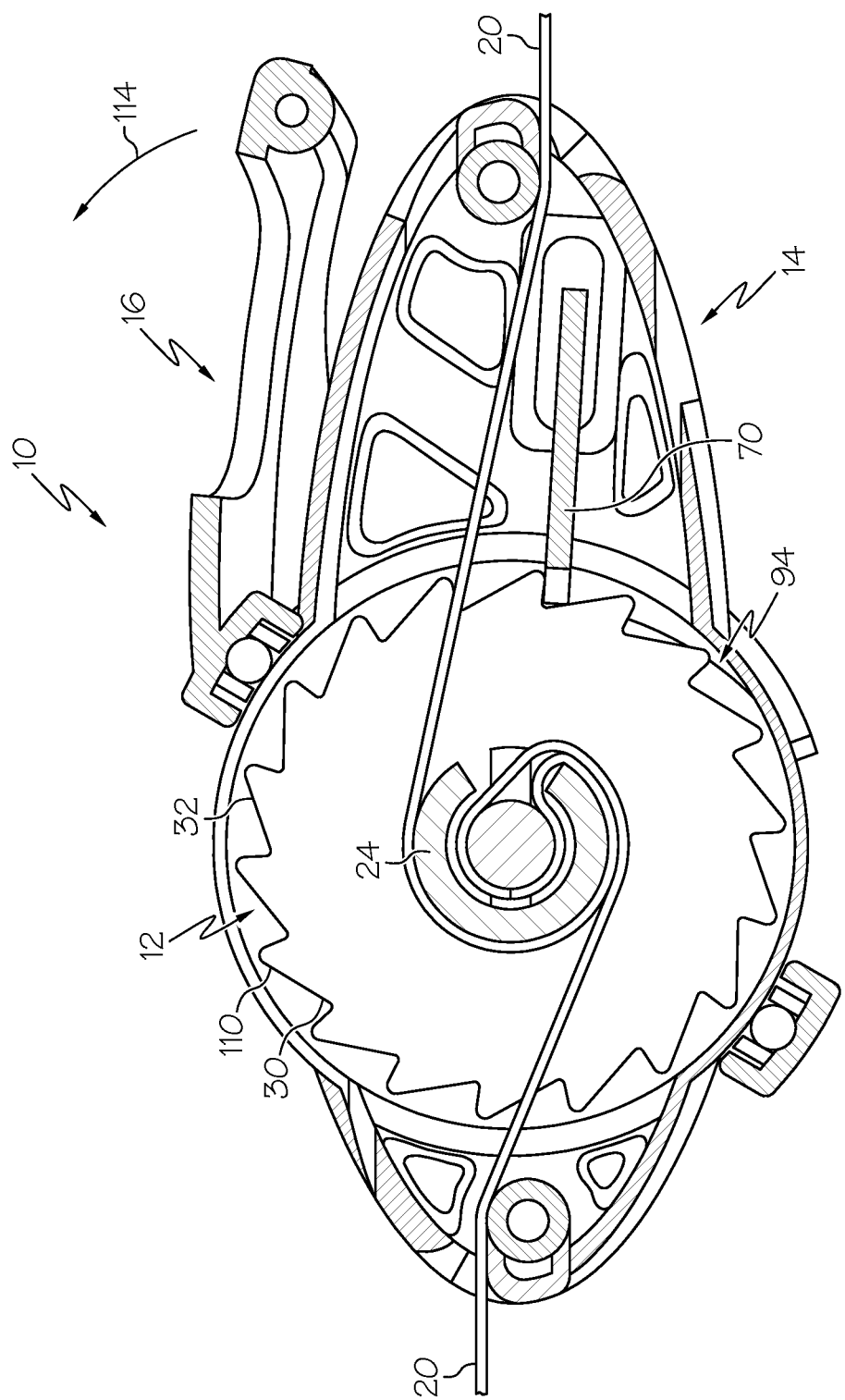
FIG. 7 is similar to FIG. 4, but shows the single tie down strap in a position between the fully extended position and the fully retracted position.

Turning to FIG. 7, rotation of the reel 12 winds the single tie down strap 20 around the hub 24 so that portions of both ends of the single tie down strap 20 are at least partially retracted into the frame assembly 14. Slack in the single tie down strap 20 is taken up as the reel is rotated counterclockwise until the single tie down strap 20 becomes relatively taut between the anchor points 126 (best seen in FIG. 8) and the reel 12. Further counterclockwise rotation of the reel 12 applies a tension force to the single tie down strap 20. Tension force in the single tie down strap 20 between the two hooks is transmitted directly through the single tie down strap 20 and transitions between segments of the tie down strap 20 at the windings of the single tie down strap 20 about the hub 24. This eliminates additional stress forces within other components of the retractable ratcheting tie down 10 such as the frame assembly 14 (best seen in FIG. 2). Many traditional tie down devices included a fixed length strap portion connected to a tie down device on one side and a variable length strap portion on the opposite side. As tension was added to the traditional tie down strap, tension forces were transmitted through the tie down device between the points of attachment of the two separate straps. The retractable ratcheting tie down 10 eliminates or substantially reduces these stress forces within the frame assembly 14 components by transmitting the applied tension directly through the single tie down strap 20. The directional forces of the tension applied to the single tie down strap 20 transition between the segments of the single tie down strap 20 at the windings of the single tie down strap 20 about the hub 24.

The tension maintained between the end points of the single tie down strap 20 can then be used to secure items such as cargo to a surface or an object such as an automobile. The arrangement of the teeth 32 on the ratchet wheel 30 permits rotation of the reel 12 in a counterclockwise direction, adding greater tension to the single tie down strap 20. However, rotation in the clockwise direction is prohibited by the interface between the pawl 70 and the teeth 32 on the ratchet wheel 30. In this way, the pawl retains the applied tension in the single tie down strap 20.

When the retractable ratcheting tie down 10 is no longer desired to tie down objects or cargo, a force is applied to the release handle 96 in the direction of arrow 114 to urge the release handle assembly 16 to rotate about centerline axis C. The cammed surface 94 urges the pawl 70 away from the ratchet wheel 30 to disengage the pawl 70 from the ratchet wheel 30. The tension forces in the single tie down strap 20 will tend to unwind the single tie down strap from the hub 24 so that the hooks 22 can be easily removed from the anchor points 126 (best seen in FIG. 8). While the pawl 70 is disengaged from the ratchet wheel 30, stored energy in the spring 100 will tend to rotate the hub 24 in a counterclockwise direction. The spring 100 (best seen in FIG. 2) is configured to retain enough energy to retract the single tie down strap 20 to a fully retracted position after the hooks 22 are removed from the anchor points 126. When the single tie down strap 20 is in the fully retracted position, substantially all of the length of the single tie down strap 20 is wound around the hub 24 as shown in FIG. 6.

Figure 8:
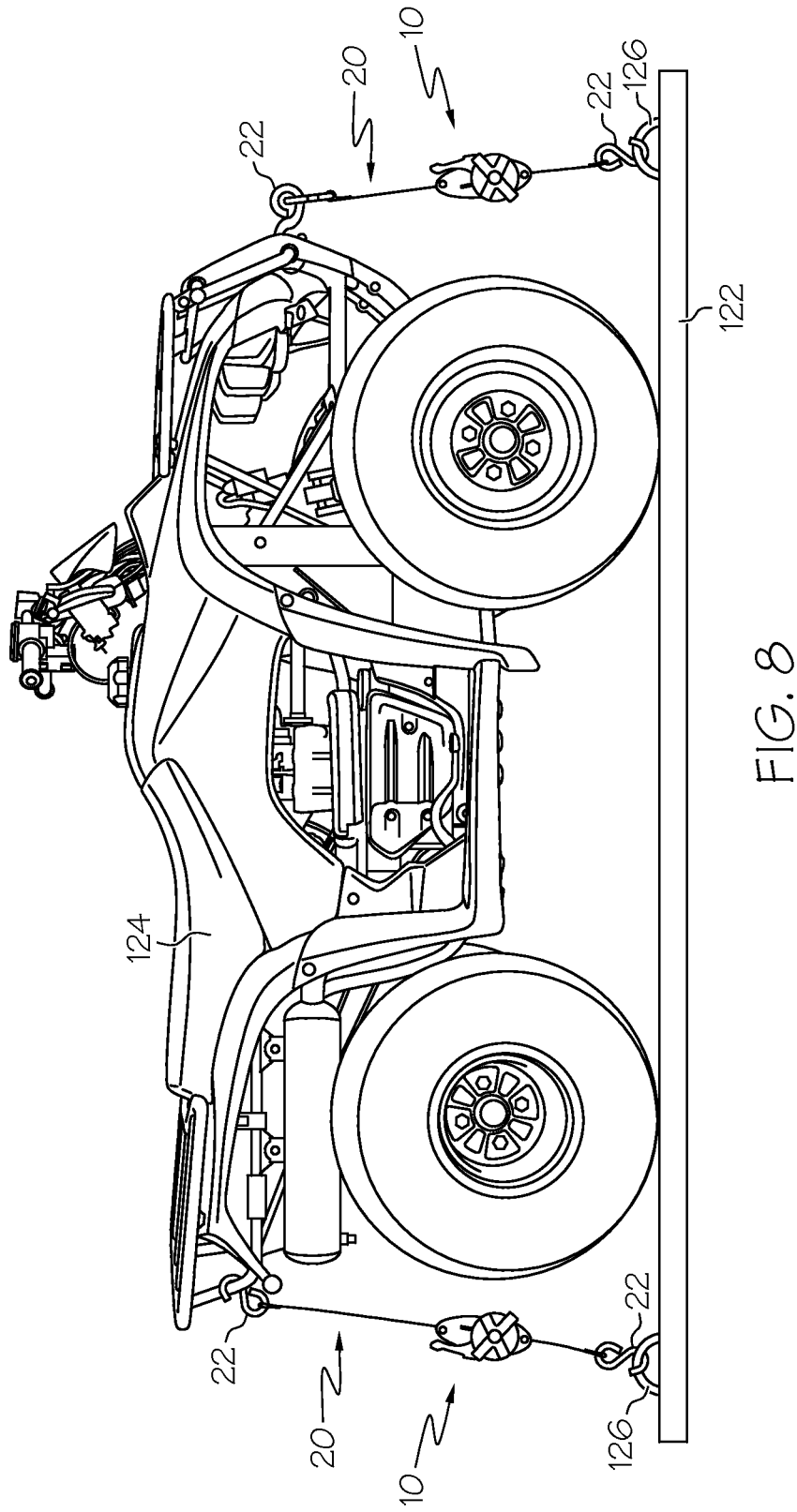
FIG. 8 is a side view of an example application for the ratcheting tie-down device of FIG. 1.

Turning now to FIG. 8, an example use for the retractable ratcheting tie down 10 is illustrated schematically in accordance with an aspect of the present invention. In the shown example, the retractable ratcheting tie down 10 is attached between a supporting surface 122 and a vehicle 124 to secure the vehicle 124 to the supporting surface 122. The single tie down strap 20 can be selectively extended a variable distance from the retractable ratcheting tie down 10 as required for coupling the vehicle 124. For example, the hooks 22 of the retractable ratcheting tie downs 10 can be attached at one end to the vehicle 124, and at the other end to anchor points 126 secured to the supporting surface 122. Similarly, the other end of the single tie down strap 20 can extend through the retractable ratcheting tie down 10 and be secured to the vehicle 124. As shown, the vehicle 124 can include an all-terrain vehicle (ATV) and the supporting surface 122 can include a trailer, truck bed, or the like, though the retractable ratcheting tie down 10 can also be used with various other wheeled and non-wheeled vehicles to various other supporting surfaces. For example, the retractable ratcheting tie down 10 can be used with cars, trucks, boats, motorcycles, bicycles, agricultural equipment, trailers, containers, and/or the like. In addition or alternatively, the retractable ratcheting tie down 10 can also be used to secure various other wheeled or non-wheeled objects, equipment, cargo, or the like to various other objects, equipment, cargo, supporting surfaces, etc. Further still, a plurality of retractable ratcheting tie downs 10 can be attached together in series (e.g., end-to-end attachment via hooks) to provide a greater length tie-down for use with relatively larger objects, equipment, etc.

One advantage of the retractable ratcheting tie down that the device includes a means of urging the hub in order to move the single tie down strap to the fully retracted position. In one example, an operator can remove the ends of the single tie down strap from anchor points and then rotate the release handle assembly to allow the spring to retract the single tie down strap so that all of or substantially all of the single tie down strap is wound within the frame of the retractable ratcheting tie down.

It is another advantage of the retractable ratcheting tie down to have two ends of the single tie down strap that are extendable and retractable rather than having one end physically fixed to the frame of the tie down device.

Another advantage of the retractable ratcheting tie down is the ability to move the frame of the device to any location between the two ends of the single tie down strap. This permits a user to place the frame at a location where the user can conveniently access the tension handle, the release handle, and other operational features of the device while the device is used to hold cargo or other objects in place.

Another advantage of the retractable ratcheting tie down is the means for applying tension to the single tie down strap is removable. The tension handle can be removed to create both a smaller footprint for the device making it easier to place among objects that are to be secured. Additionally, the removable tension handle can discourage unauthorized use of the device. Also, the removable tension handle can help limit interference between the handle and the objects being secured.

Still another advantage of the retractable ratcheting tie down is the elimination of all of or substantially all of the stress forces passing through the frame of traditional tie down devices. The retractable ratcheting tie down transmits the tension applied between two attachment members directly through the single tie down strap. Many previous tie down devices included at least two separate straps that were connected to different points on the tie down device, thereby allowing tension force to pass through the tie down device between the straps' points of attachment.

The invention has been described with reference to various example embodiments. Obviously, modifications and alterations will occur to others upon a reading and understanding of this specification. It is intended to include all such modifications and alterations.

What is claimed is:

1. A retractable ratcheting tie down apparatus including:
a frame;
a hub rotatably mounted within the frame;
a ratchet wheel mounted to the hub;
a pawl, wherein the pawl interfaces with the ratchet wheel to selectably prevent motion of the hub relative to the frame;
a single tie down strap extending between two attachment members, the single tie down strap extending through the hub between the two attachment members, the single tie down strap configured to permit winding of the single tie down strap around the hub;
an operable means for applying a tension force to the single tie down strap and for rotating the hub and ratchet wheel to wind the single tie down strap around the hub such that tension between the two attachment members is transmitted directly through the single tie down strap and transitions between segments of the single tie down strap at the windings of the single tie down strap about the hub; and
a means of urging the hub in order to move the single tie down strap to a fully retracted position.

2. The retractable ratcheting tie down apparatus of claim 1, further including a release handle, wherein the release handle is configured to remove the interface between the pawl and the reel.

3. The retractable ratcheting tie down apparatus of claim 1, wherein the means of applying a tension force to the single tie down strap is a tension handle configured to apply a rotational force to the hub.

4. The retractable ratcheting tie down apparatus of claim 3, wherein the tension handle further includes a ratchet.

5. The retractable ratcheting tie down apparatus of claim 1, wherein the frame defines at least two frame apertures configured to prevent rotation of the frame relative to the single tie down strap during an operation to apply tension force to the single tie down strap.

6. A retractable ratcheting tie down apparatus including:
a frame;
a hub rotatably mounted within the frame;
a ratchet wheel mounted to the hub;
a pawl, wherein the pawl interfaces with the ratchet wheel to selectably prevent motion of the hub relative to the frame;
a single tie down strap extending between two attachment members, the single tie down strap extending through the hub between the two attachment members, the single tie down strap configured to permit winding of the single tie down strap around the hub;
an operable means for applying a tension force to the single tie down strap and for rotating the hub and ratchet wheel to wind the single tie down strap around the hub such that tension between the two attachment members is transmitted directly through the single tie down strap and transitions between segments of the single tie down strap at the windings of the single tie down strap about the hub, wherein the operable means for rotating the hub and ratchet wheel is removable from the retractable ratcheting tie down apparatus; and
a means of urging the hub in order to move the single tie down strap to a fully retracted position.

7. The retractable ratcheting tie down apparatus of claim 6, further including a release handle, wherein the release handle is configured to remove the interface between the pawl and the reel.

8. The retractable ratcheting tie down apparatus of claim 6, wherein the means of applying a tension force to the single tie down strap is a tension handle configured to apply a rotational force to the hub.

9. The retractable ratcheting tie down apparatus of claim 8, wherein the tension handle further includes a ratchet.

10. The retractable ratcheting tie down apparatus of claim 6, wherein the frame defines at least two frame apertures configured to prevent rotation of the frame relative to the single tie down strap during an operation to apply tension force to the single tie down strap.

11. A retractable ratcheting tie down apparatus including:
a frame;
a hub rotatably mounted within the frame;
a ratchet wheel mounted to the hub;
a pawl, wherein the pawl interfaces with the ratchet wheel to selectably prevent motion of the hub relative to the frame;
a single tie down strap extending between two attachment members, the single tie down strap extending through the hub between the two attachment members, the single tie down strap configured to permit winding of the single tie down strap around the hub, wherein the single tie down strap extends through the hub such that the frame can freely move along the single tie down strap when the single tie down strap is in the a fully extended position;
an operable means for applying a tension force to the single tie down strap and for rotating the hub and ratchet wheel to wind the single tie down strap around the hub such that tension between the two attachment members is transmitted directly through the single tie down strap and transitions between segments of the single tie down strap at the windings of the single tie down strap about the hub; and
a release handle, wherein the release handle is configured to remove the interface between the pawl and the reel.

12. The retractable ratcheting tie down apparatus of claim 11, further including a means of urging the hub in order to move the single tie down strap to a fully retracted position.

13. The retractable ratcheting tie down apparatus of claim 11, wherein the means of applying a tension force to the single tie down strap is a tension handle configured to apply a rotational force to the hub.

14. The retractable ratcheting tie down apparatus of claim 13, wherein the tension handle further includes a ratchet.

15. The retractable ratcheting tie down apparatus of claim 11, wherein the frame defines at least two frame apertures configured to prevent rotation of the frame relative to the single tie down strap during an operation to apply tension force to the single tie down strap.

16. A retractable ratcheting tie down apparatus including:
a frame;
a hub rotatably mounted within the frame;
a ratchet wheel mounted to the hub;
a pawl, wherein the pawl interfaces with the ratchet wheel to selectably prevent motion of the hub relative to the frame;
a single tie down strap extending between two attachment members, the single tie down strap extending through the hub between the two attachment members, the single tie down strap configured to permit winding of the single tie down strap around the hub;
an operable means for applying a tension force to the single tie down strap and for rotating the hub and ratchet wheel to wind the single tie down strap around the hub such that tension between the two attachment members is transmitted directly through the single tie down strap and transitions between segments of the single tie down strap at the windings of the single tie down strap about the hub; and
a release handle, wherein the release handle is configured to remove the interface between the pawl and the reel.

17. The retractable ratcheting tie down apparatus of claim 16, wherein the means of applying a tension force to the single tie down strap is a tension handle configured to apply a rotational force to the hub.

18. The retractable ratcheting tie down apparatus of claim 17, wherein the tension handle further includes a ratchet.

19. The retractable ratcheting tie down apparatus of claim 16, wherein the frame defines at least two frame apertures configured to prevent rotation of the frame relative to the single tie down strap during an operation to apply tension force to the single tie down strap.

* * * * *